United States Patent
Uchino et al.

(10) Patent No.: US 8,906,473 B2
(45) Date of Patent: Dec. 9, 2014

(54) LIQUID CRYSTAL DISPLAY DEVICE

(75) Inventors: Shoichi Uchino, Annaka (JP); Noboru Kunimatsu, Chiba (JP); Hidehiro Sonoda, Mobara (JP); Chikae Matsui, Mobara (JP); Yuko Matsumoto, Onjuku (JP); Masaki Matsumori, Tokai Naka-gun (JP); Yasushi Tomioka, Hitachinaka (JP); Jun Tanaka, Kawasaki (JP)

(73) Assignees: Japan Display Inc., Tokyo (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 121 days.

(21) Appl. No.: 12/908,313

(22) Filed: Oct. 20, 2010

(65) Prior Publication Data

US 2011/0096277 A1 Apr. 28, 2011

(30) Foreign Application Priority Data

Oct. 23, 2009 (JP) ................. 2009-244721

(51) Int. Cl.
*G02F 1/1337* (2006.01)
*C08G 73/10* (2006.01)

(52) U.S. Cl.
CPC ...... *C08G 73/1078* (2013.01); *G02F 1/133723* (2013.01); *C08G 73/1064* (2013.01)
USPC ............... 428/1.26; 428/1.1; 428/1.2

(58) Field of Classification Search
CPC .. C09J 2479/00; C08J 2377/00; C08G 73/10; C08G 73/12; C08G 73/14; C08G 73/16; C08G 73/18; C09D 5/4461; C08L 79/04; C08L 79/08; C08L 79/085; G02F 1/133711; G02F 1/133719; G02F 1/133723; G02F 2001/1337; C09K 19/56

USPC .............. 349/84, 123, 139; 427/487; 428/1.2, 428/1.55
See application file for complete search history.

(56) References Cited

U.S. PATENT DOCUMENTS 3,489,696 A * 1/1970 Miller ........................... 521/157
4,490,545 A * 12/1984 Winzenburg et al. ......... 549/234
5,759,442 A * 6/1998 Auman et al. .............. 252/299.4

(Continued)

FOREIGN PATENT DOCUMENTS

| JP | 2004-086047 | | 3/2004 |
| JP | 3937432 | | 4/2007 |
| JP | 2007140156 A | * | 6/2007 |

OTHER PUBLICATIONS

Tanioka, Satoshi, English Translation of JP 2007140156 A by http://dossier1.ipdl.inpit.go.jp/AIPN/odse_top_dn.ipdl?N0000=7400.*

*Primary Examiner* — Erik Kashnikow
*Assistant Examiner* — Eli D Strah
(74) *Attorney, Agent, or Firm* — Antonelli, Terry, Stout & Kraus, LLP.

(57) ABSTRACT

A liquid crystal display device includes: a pair of substrates at least one of which is transparent; a liquid crystal layer disposed between the pair of substrates; an electrode group formed on at least one substrate of the pair of substrates, for applying an electric field to the liquid crystal layer; a plurality of active elements connected to the electrode group; and a liquid crystal alignment film disposed on at least one substrate of the pair of substrates, in which the liquid crystal alignment film, which is formed by a photo-alignment process, contains polyimide formed using tetracarboxylic acid dianhydride and/or diamine each having a specific chemical structure.

11 Claims, 3 Drawing Sheets

(56) References Cited

U.S. PATENT DOCUMENTS

| | | | |
|---|---|---|---|
| 2004/0165132 A1* | 8/2004 | Tomioka et al. | 349/123 |
| 2006/0061719 A1* | 3/2006 | Tomioka et al. | 349/123 |
| 2007/0232780 A1* | 10/2007 | Tamura | 528/310 |
| 2011/0080547 A1* | 4/2011 | Matsumori et al. | 349/124 |
| 2011/0221984 A1* | 9/2011 | Matsumori et al. | 349/33 |

* cited by examiner

LIQUID CRYSTAL DISPLAY DEVICE

CROSS-REFERENCE TO RELATED APPLICATION

The present application claims priority from Japanese application JP 2009-244721 filed on Oct. 23, 2009, the content of which is hereby incorporated by reference into this application.

BACKGROUND OF THE INVENTION

1. Field of the Invention

The present invention relates to a liquid crystal display device. More specifically, the present invention relates to a liquid crystal display device having a liquid alignment film formed by a photo-alignment method.

2. Description of the Related Art

In general, a liquid crystal display device performs a display using a change in optical characteristics of a liquid crystal layer caused by applying an electric field to liquid crystal molecules in a liquid crystal layer sandwiched between a pair of substrates to change the alignment of the liquid crystal molecules.

In a pair of substrates, a liquid crystal alignment film typically made of polyimide, polyamic acid, or the like is provided on an interface between a liquid crystal layer and a substrate and plays a role of aligning liquid crystal molecules in the liquid crystal layer in a predetermined direction.

As an industrial method of providing an organic coating film formed of polyimide or the like with a function of aligning liquid crystal molecules (hereinafter, referred to as "alignment capability"), a rubbing alignment process is widely known.

The rubbing alignment process is a method of rubbing the surface of an organic coating film formed on the surface of a substrate with a cloth made of nylon, polyester, or the like in a predetermined direction. This provides the surface of the organic coating film with alignment capability in the rubbed direction.

The rubbing alignment treatment is an industrially effective method because the treatment can provide the surface of an organic coating film with uniform alignment capability relatively easily and in addition, is excellent in productivity. However, along with the recent enlargement of liquid crystal display devices, problems of the rubbing alignment treatment have come to be pointed out.

As described above, the rubbing alignment treatment includes the step of allowing an organic coating film and a cloth to rub against each other physically. Therefore, unwanted shavings (scrapings) may be generated on the surface of the liquid crystal alignment film thus formed. The shavings cause display defects in a liquid crystal display device. The amount of shavings increases along with the enlargement of a liquid crystal display device, and hence there is apprehension that a defect occurrence ratio may increase. Consequently, there is a demand for the establishment of a treatment method that can replace the rubbing alignment treatment.

As an alignment treatment method replacing the rubbing alignment treatment, a photo-alignment process is known. The photo-alignment process is a method of providing a surface of an organic coating film with alignment capability by irradiating the surface of the organic coating film formed on the surface of a substrate with substantially linearly polarized UV rays (see, for example, U.S. Pat. No. 3,937,432).

SUMMARY OF THE INVENTION

The photo-alignment process is a clean alignment treatment method that does not allow shavings to be generated through a step.

However, the irradiation of polarized UV rays in the step of the photo-alignment process also influences a substrate to be coated with the organic coating film. For example, there arises such a new problem that a member forming the substrate may be damaged by irradiating the substrate with UV rays. In order to avoid such problem, it is necessary to conduct the photo-alignment process at a low exposure amount. In order to realize the photo-alignment process at the low exposure amount, it is necessary to enhance sensitivity with respect to light exposure of the organic coating film.

An object of the present invention is to provide a liquid crystal display device having a liquid crystal alignment film with high sensitivity with respect to light exposure. Further, the above-mentioned object, another object, and new features become apparent from the description of the present specification and the attached drawings.

A liquid crystal display device according to the present invention includes: a pair of substrates at least one of which is transparent; a liquid crystal layer disposed between the pair of substrates; an electrode group formed on at least one substrate of the pair of substrates, for applying an electric field to the liquid crystal layer; a plurality of active elements connected to the electrode group; and a liquid crystal alignment film disposed on at least one substrate of the pair of substrates, in which the liquid crystal alignment film, which is formed by a photo-alignment process, contains polyimide formed using at least one kind of tetracarboxylic acid dianhydride selected from a compound group A represented by the following Chemical Formulae (1) to (7).

[Compound group A]

(1)

(2)

(3)

(4)

(5)

(6)

(7)

In the formulae (1) to (7), $R_1$s each independently represent hydrogen, an alkyl group having a carbon number of 3 or less, or a dialkylamino group, and at least one $R_1$ is a dialkylamino group.

Further, S represents —$(CH_2)_n$—, and n represents an integer of 1 to 10.)

Thus, there can be provided a liquid crystal display device having a liquid crystal alignment film with high sensitivity with respect to the light exposure in photo-alignment.

Further, a liquid crystal alignment device according to the present invention includes: a pair of substrates at least one of which is transparent; a liquid crystal layer disposed between the pair of substrates; an electrode group formed on at least one substrate of the pair of substrates, for applying an electric field to the liquid crystal layer; a plurality of active elements connected to the electrode group; and a liquid crystal alignment film disposed on at least one substrate of the pair of substrates, in which the liquid crystal alignment film, which is formed by a photo-alignment process, contains polyimide formed using at least one kind of diamine selected from a compound group B represented by the following Chemical Formulae (8) to (10).

[Compound group B]

(8)

(9)

(10)

Among $R_2$s contained in each of the formulae (8) to (10), at least two $R_2$s each independently represent a methyl group, an alkoxy group having a carbon number of 3 or less, a dialkylamino group, or an alkylamino group and the other $R_2$s each independently represent hydrogen or an alkyl group having a carbon number of 3 or less.

Thus, there can be provided a liquid crystal display device having a liquid crystal alignment film with high sensitivity with respect to the light exposure in photo-alignment.

Thus, there can be provided a liquid crystal display device having a liquid crystal alignment film with high sensitivity with respect to the light exposure.

DETAILED DESCRIPTION OF THE INVENTION

A liquid crystal display device according to the present invention, for example, includes: a pair of substrates at least one of which is transparent; a liquid crystal layer disposed between the pair of substrates; an electrode group formed on at least one substrate of the pair of substrates, for applying an electric field to the liquid crystal layer; a plurality of active elements connected to the electrode group; and a liquid crystal alignment film disposed on at least one substrate of the pair of substrates, in which the liquid crystal alignment film, which is formed by a photo-alignment process, contains polyimide formed using at least one kind of tetracarboxylic acid dianhydride selected from a compound group A represented by the following Chemical Formulae (1) to (7).

[Compound group A]

In the formulae (1) to (7), $R_1$s each independently represent hydrogen, an alkyl group having a carbon number of 3 or less, or a dialkylamino group, and at least one $R_1$ is a dialkylamino group.

Further, S represents $-(CH_2)_n-$, and n represents an integer of 1 to 10.

With the above-mentioned formulae, a liquid crystal display device having a liquid crystal alignment film with satisfactory exposure sensitivity can be obtained.

The exposure sensitivity in the present invention is evaluated based on the exposure amount (irradiation energy) to be required until the photo-alignment process is completed. Further, the exposure amount is obtained by a product of an illumination by an irradiation time.

In the case where the exposure sensitivity of an organic coating film formed on a substrate is satisfactory, the organic coating film becomes a liquid crystal alignment film through a photo-alignment process at a low exposure amount.

The liquid crystal alignment film in the present invention is characterized by being provided with alignment capability through a photo-alignment process.

The photo-alignment process is a method of irradiating the surface of a formed organic coating film with substantially linearly polarized UV rays. Thus, the organic coating film is provided with alignment capability to be a liquid crystal alignment film.

With the photo-alignment process, the organic coating film is irradiated with UV rays to cause a structural change in a part of the molecular structure of a compound constituting the organic coating film, and hence, the organic coating film is provided with alignment capability.

For example, in molecular structures of polyimide and a precursor thereof, alignment capability is provided through a process in which a part of the molecular structures of polyimide and the precursor thereof is cleaved due to the irradiation of UV rays.

More specifically, the exposure amount required for realizing photo-alignment is the amount of energy that can cause the above-mentioned structural change. Respective organic coating films that can form a liquid crystal alignment film by a photo-alignment process are different in exposure amount required for realizing a photo-alignment process depending upon the compositions of compounds constituting the organic coating films.

In the case of conducting a photo-alignment process using the same light source, an organic coating film with exposure sensitivity improved can shorten an irradiation time of the photo-alignment process. In addition, when a lamp with a high illumination is used, an irradiation time is further shortened.

When UV rays are irradiated in the photo-alignment process, the generation of ozone also increases along with the increase in exposure amount. The generated ozone damages another member provided on a substrate, and may cause a problem such as degradation in performance of a liquid crystal display device. Conducting a photo-alignment process with a low exposure amount means that the above-mentioned problems can be avoided.

The liquid crystal alignment film provided in the liquid crystal display device obtained in the present invention has high sensitivity with respect to the light exposure, while having characteristics such as a high light transmittance (less absorption of visible light), heat resistance, high coating film strength, and a function of aligning liquid crystal molecules (hereinafter, referred to as "alignment capability").

Compounds represented by Chemical Formulae (1) to (7) react with diamine to form polyamic acid and/or a polyamic acid ester that are precursors of polyimide. Further, the polyamic acid and/or polyamic acid ester form polyimide by an imidization reaction.

A liquid crystal alignment film formed of polyimide and a precursor thereof has characteristics such as a high light transmittance (less absorption of visible light), heat resistance, high coating film strength, and a function of aligning liquid crystal molecules (hereinafter, referred to as "alignment capability"), and hence, is used widely in a liquid crystal display device.

Examples of diamine that reacts with the compounds represented by Chemical Formulae (1) to (7) include p-phenylenediamine, 4,4'-diaminodiphenylmethane, 4,4'-diaminodiphenylsulfide, and 1,5-diaminonaphthalene. These diamines can be used alone or in combination of two or more kinds, for the reaction with the compounds represented by Chemical Formulae (1) to (7).

Further, the polyamic acid ester can be obtained by allowing a chlorinated reagent such as thionyl chloride to react with diesterdicarboxylic acid obtained by allowing alcohol to react with a tetracarboxylic acid dianhydride represented by Chemical Formulae (1) to (7) to obtain diesterdicarboxylic acid chloride, and then allowing diamine to react with and to be polycondensed with the diesterdicarboxylic acid chloride.

Furthermore, in the case where diamine and a plurality of kinds of materials of a tetracarboxylic acid dianhydride are mixed, a copolymerized polymer in which a plurality of chemical species is polymerized with one polymer chain can be obtained.

Polyimide constituting the liquid crystal alignment film is formed by heating polyamic acid and/or a polyamic acid ester that are precursors thereof, and allowing an imidization reaction (intramolecular condensation reaction) to proceed.

Further, it is preferred that polyimide with a high molecular weight constitute a liquid crystal alignment film, in terms of providing the liquid crystal alignment film with alignment capability. A polyamic acid ester is unlikely to cause a decomposition reaction during heating, compared with polyamic acid. More specifically, the polyamic acid ester is unlikely to undergo any decrease in molecular weight in a heating step described later. Therefore, it is effective that a polyamic acid ester is introduced into a liquid crystal alignment film, in terms of preventing the decrease in molecular weight of polyimide.

Next, the step of forming a liquid crystal alignment film containing polyimide is described.

Polyimide is insoluble in a number of oil solvents. Therefore, in the case of forming a liquid crystal alignment film containing polyimide as a main component, polyamic acid and/or a polyamic acid ester that are precursors of polyimide are dissolved in a solvent to prepare a liquid crystal alignment agent varnish, the varnish is applied to at least one of a pair of substrates, on which the liquid crystal alignment film is to be formed, followed by heating and imidization, alignment treatment is conducted, and thus, a liquid crystal alignment film of polyimide is formed.

In the above-mentioned heating step, the solvent contained in the liquid crystal alignment agent varnish is volatilized, and an organic coating film of polyamic acid and/or a polyamic acid ester is formed. At the same timing as that in the formation of the organic coating film, the imidization reaction of polyamic acid and/or a polyamic acid ester proceeds.

It is not always necessary to progress the imidization reaction by 100%, and the imidization reaction is advanced preferably by 40% to 100% of the total, more preferably by 50% to 95%, and still more preferably by 60% to 90%.

The polyimide and the precursor thereof formed using the compounds represented by Chemical Formulae (1) to (7) are preferred for providing alignment capability in the photo-alignment process.

When the polyimide and the precursor thereof formed using the compounds represented by Chemical Formulae (1) to (7) are irradiated with UV rays, an intermediate is formed in the molecular structure of the polyimide and the precursor thereof.

The intermediate thus formed is considered to act on photo-alignment effectively. In order to perform a photo-alignment process effectively, it is important how easily the intermediate is formed.

The formation of the above-mentioned intermediate in the molecular structures of the polyimide and the precursor thereof is ascribed to the cleavage of a part of the molecular structures of the polyimide and the precursor thereof caused by the irradiated UV rays.

Thus, in order to conduct a photo-alignment process effectively, it is necessary that a part of the molecular structures of polyimide and a precursor thereof is cleaved at high sensitivity by the irradiated UV rays.

The compounds represented by Chemical Formulae (1) to (7) are characterized by having a dialkylamino group that is an electron donating group in the molecular structure thereof.

The polyimide and the precursor thereof formed using the compounds represented by Chemical Formulae (1) to (7) have a dialkylamino group derived from the compounds represented by Chemical Formulae (1) to (7) in the molecular structure.

The inventors of the present invention have found that, in the case where polyimide and a precursor thereof having a dialkylamino group in molecular structures are irradiated with UV rays to be irradiated in a photo-alignment process, an intermediate is formed in molecular structures of the polyimide and the precursor thereof at a low exposure amount.

The liquid crystal alignment film provided in the liquid crystal display device of the present invention realizes the enhanced sensitivity with respect to UV rays irradiated in the photo-alignment process due to the fact that a dialkylamino group that is an electron donating group is contained in molecular structures of polyimide and a precursor thereof constituting the liquid crystal alignment film.

Thus, the UV irradiation amount in the photo-alignment process can be reduced.

The case where all of $R_1$ in the molecular structures in the compounds represented by Chemical Formulae (1) to (7) are methyl groups that are electron donating groups is compared with the case where one of $R_1$ is a dialkylamino group. In the case where one of $R_1$ is a dialkylamino group, a liquid crystal alignment film with further satisfactory exposure sensitivity can be obtained. However, the addition of methyl groups to the molecular structures of the compounds represented by Chemical Formulae (1) to (7) is effective for enhancing exposure sensitivity.

Thus, it is more preferred that $R_1$s contained in the structures of the compounds represented by Chemical Formulae (1) to (7) each independently represent hydrogen, a methyl group, or a dialkylamino group, and at least one $R_1$ be a dialkylamino group.

In addition, it is preferred that, in the above-mentioned dialkylamino group, any of the alkyl groups be dialkylamino groups having a carbon number of 3 or less. Further, it is more preferred that one of two alkyl groups of the dialkylamino group be a dialkylamino group that is a methyl group. Further, the fact that one alkyl group of the dialkylamino group is an alkyl group having a carbon number of 3 or less, and the other alkyl group is a methyl group can further enhance exposure sensitivity. Further, it is particularly preferred that the above-mentioned dialkylamino group be a dimethylamino group.

Thus, it is preferred that $R_1$s contained in the structures of the compounds represented by Chemical Formulae (1) to (7) each independently represent hydrogen, a methyl group, or a dialkylamino group in which any of alkyl groups have a carbon number of 3 or less, and at least one $R_1$ be a dialkylamino group.

Further, it is more preferred that $R_1$s contained in the structures of the compounds represented by Chemical Formulae (1) to (7) each independently represent hydrogen, a methyl group, or a dialkylamino group in which one alkyl group is a methyl group, and at least one $R_1$ be a dialkylamino group.

Further, it is further more preferred that $R_1$s contained in the structures of the compounds represented by Chemical Formulae (1) to (7) each independently represent hydrogen, a methyl group, or a dialkylamino group in which one alkyl group is an alkyl group having a carbon number of 3 or less and the other alkyl group is a methyl group, and at least one $R_1$ be a dialkylamino group.

Further, it is particularly preferred that $R_1$s contained in the structures of the compounds represented by Chemical Formulae (1) to (7) each independently represent hydrogen, a methyl group, or a dimethylamino group, and at least one $R_1$ be a dimethylamino group.

In the case where the above-mentioned dialkylamino group is contained, $R_1$s contained in the structures of the compounds represented by Chemical Formulae (1) to (7) may each independently represent hydrogen, or a dialkylamino group in which any of the alkyl groups are dialkylamino groups having a carbon number of 3 or less, and at least one $R_1$ may be a dialkylamino group.

Further, $R_1$s contained in the structures of the compounds represented by Chemical Formulae (1) to (7) may each independently represent hydrogen or a dialkylamino group in which one alkyl group is a methyl group, and at least one $R_1$ may be a dialkylamino group.

Further, $R_1$s contained in the structures of the compounds represented by Chemical Formulae (1) to (7) may each independently represent hydrogen or a dialkylamino group in which one alkyl group is an alkyl group having a carbon number of 3 or less and the other alkyl group is a methyl group, and at least one $R_1$ may be a dialkylamino group.

Further, $R_1$s contained in the structures of the compounds represented by Chemical Formulae (1) to (7) may each independently represent hydrogen or a dimethylamino group, and at least one $R_1$ may be a dimethylamino group.

Further, the case where electron donating groups other than dialylamino groups and other functional groups are added to the molecular structures of the compounds represented by Chemical Formulae (1) to (7) is described.

For example, in the case where a hydroxyl group that is an electron donating group is added, the surface of a formed liquid crystal alignment film is provided with hydrophilicity. It is also a preferred embodiment that a hydroxyl group is not contained, in terms of the physical properties of the liquid crystal alignment film.

Further, as a halogen group, a phenyl group, a nitro group, and the like are electron attracting groups, it is preferred that these groups may not be contained in the molecular structures of the compounds represented by Chemical Formulae (1) to (7). However, they may be contained as long as the effects of the present invention are not impaired.

Further, the alkylamino group also has an effect useful for enhancing exposure sensitivity as well as the dialkylamino group.

The photo-alignment process for compounds formed using the compounds represented by Chemical Formulae (1) to (7) as materials was conducted by extracting UV rays at 257 nm using a low-pressure mercury lamp as a light source, and irradiating an organic coating film formed on a substrate with irradiation light linearly polarized with a pile polarizer in which quartz substrates are laminated on each other at predetermined irradiation energy.

Further, a liquid crystal display device according to the present invention, for example, includes: a pair of substrates at least one of which is transparent; a liquid crystal layer disposed between the pair of substrates; an electrode group formed on at least one substrate of the pair of substrates, for applying an electric field to the liquid crystal layer; a plurality of active elements connected to the electrode group; and a liquid crystal alignment film disposed on at least one substrate of the pair of substrates, in which the liquid crystal alignment film, which is formed by a photo-alignment process, contains polyimide formed using at least one kind of diamine selected from a compound group B represented by the following Chemical Formulae (8) to (10).

[Compound group B]

Among $R_2$s contained in each of the formulae (8) to (10), at least two $R_2$s each independently represent a methyl group, an alkoxy group having a carbon number of 3 or less, a dialkylamino group, or an alkylamino group and the other $R_2$s each independently represent hydrogen or an alkyl group having a carbon number of 3 or less.

With the above-mentioned formulae, a liquid crystal display device having a liquid crystal alignment film with satisfactory exposure sensitivity can be obtained. The liquid crystal alignment film provided in the liquid crystal display device obtained in the present invention has high sensitivity with respect to the light exposure, while having characteristics such as a high light transmittance (less absorption of visible light), heat resistance, high coating film strength, and a function of aligning liquid crystal molecules (hereinafter, referred to as "alignment capability").

Diamine represented by Chemical Formulae (8) to (10) react with tetracarboxilic acid dianhydride to form polyamic acid and/or a polyamic acid ester that are precursors of polyimide. Further, the polyamic acid and/or polyamic acid ester form polyimide by an imidization reaction.

A liquid crystal alignment film formed of polyimide and a precursor thereof has characteristics such as a high light transmittance (less absorption of visible light), heat resistance, high coating film strength, and a function of aligning liquid crystal molecules (hereinafter, referred to as "alignment capability"), and hence, is used widely in a liquid crystal display device.

A tetracarboxylic acid dianhydride that reacts with the compounds represented by Chemical Formulae (8) to (10) to form a precursor of polyimide is illustrated below.

For example, there are given 1,2,3,4-cyclobutane tetracarboxylic acid dianhydride, 1,2-dimethyl-1,2,3,4-cyclobutane tetracarboxylic acid dianhydride, 1,3-dimethyl-1,2,3,4-cyclobutane tetracarboxylic acid dianhydride, 1,2,3,4-tetramethyl-1,2,3,4-cyclobutane tetracarboxylic acid dianhydride, 1,2,3-trimethyl-1,2,3,4-cyclobutane tetracarboxylic acid dianhydride, 1,2,3,4-cyclopentane tetracarboxylic acid dianhydride, and 1,2,4,5-cyclohexane tetracarboxylic acid dianhydride. Those compounds may be used alone or in combination of two or more kinds.

Further, the polyamic acid ester can be obtained by, for example, allowing a chlorinated reagent such as thionyl chloride to react with diesterdicarboxylic acid obtained by allowing alcohol to react with a tetracarboxylic acid dianhydride shown above to obtain diesterdicarboxylic acid chloride, and allowing diamine to react with and to be polycondensed with diesterdicarboxylic acid chloride.

Furthermore, in the case where diamine and a plurality of kinds of materials of the tetracarboxylic acid dianhydrides are mixed, a copolymerized polymer in which a plurality of chemical species are polymerized with one polymer chain can be obtained.

Polyimide constituting the liquid crystal alignment film is formed by heating polyamic acid and/or a polyamic acid ester that are precursors of polyimide to allow the imidization reaction to proceed.

Further, it is preferred that polyimide having a high molecular weight constitute the liquid crystal alignment film in terms of providing the liquid crystal alignment film with alignment capability. The polyamic acid ester is unlikely to cause a decomposition reaction during heating, compared with polyamic acid. More specifically, the polyamic acid ester is unlikely to undergo any decrease in molecular weight in a heating step described later. Therefore, it is effective that a polyamic acid ester is introduced into a liquid crystal alignment film, in terms of preventing the decrease in molecular weight of polyimide.

Next, the step of forming a liquid crystal alignment film containing polyimide is described. Polyimide is insoluble in a number of oil solvents. Therefore, in the case of forming a liquid crystal alignment film containing polyimide as a main component, polyamic acid and/or a polyamic acid ester that are precursors of polyimide are dissolved in a solvent to prepare a liquid crystal alignment agent varnish, the varnish is applied to at least one of a pair of substrates, on which the liquid crystal alignment film is to be formed, followed by heating and imidization, alignment treatment is conducted, and thus, a liquid crystal alignment film of polyimide is formed.

In addition, in the above-mentioned heating step, the solvent contained in the liquid crystal alignment agent varnish is volatilized, and an organic coating film of polyamic acid and/or a polyamic acid ester is formed. At the same timing as that in the formation of the organic coating film, the imidization reaction of polyamic acid and/or a polyamic acid ester proceeds.

It is not always necessary to progress the imidization reaction by 100%, and the imidization reaction is advanced preferably by 40% to 100% of the total, more preferably by 50% to 95%, and still more preferably by 60% to 90%.

The polyimide and the precursor thereof formed using diamine represented by Chemical Formulae (8) to (10) are preferred for providing alignment capability in the photo-alignment process.

When the polyimide and the precursor thereof are irradiated with UV rays, an intermediate is formed in the molecular structures of the polyimide and the precursor thereof.

The intermediate thus formed is considered to act on photo-alignment effectively. In order to perform a photo-alignment process effectively, it is important how easily the intermediate is formed.

The formation of the above-mentioned intermediate in the molecular structures of the polyimide and the precursor thereof is ascribed to the cleavage of a part of the molecular structures of the polyimide and the precursor thereof caused by the irradiated UV rays.

Thus, in order to conduct a photo-alignment process effectively, it is necessary that a part of the molecular structures of polyimide and a precursor thereof is cleaved at high sensitivity by the irradiated UV rays.

The compounds represented by Chemical Formulae (8) to (10) are characterized by having a methyl group that is an electron donating group in the molecular structure thereof, an alkoxy group having a carbon number of 3 or less, a dialkylamino group, or an alkylamino group.

The polyamic acid and/or the polyamic acid ester formed using the compounds represented by Chemical Formulae (8) to (10) have, in the molecular structure thereof, a methyl group, an alkoxy group having a carbon number of 3 or less, a dialkylamino group, or an alkylamino group each derived from the molecular structures of the compounds represented by Chemical Formulae (8) to (10).

The inventors of the present invention have found that, in the case where polyimide and a precursor thereof formed using the compounds represented by Chemical Formulae (8) to (10) are irradiated with UV rays to be irradiated in a photo-alignment process, an intermediate is formed in molecular structures of the polyimide and the precursor thereof at a low exposure amount.

Thus, the UV irradiation amount in the photo-alignment process can be reduced.

Further, in the case where the compounds represented by Chemical Formulae (8) to (10) contain an alkoxy group, an alkoxy group having a carbon number of 2 or less is preferred, and a methoxy group is more preferred.

More specifically, it is more preferred that at least two $R_2$s among $R_2$s contained in each of the compounds represented by Chemical Formulae (8) to (10) each independently represent a methyl group, an alkoxy group having a carbon number of 2 or less, a dialkylamino group, or an alkylamino group, and the other $R_2$s each independently represent hydrogen or an alkyl group having a carbon number of 3 or less.

Further, it is further preferred that at least two $R_2$s among $R_2$s contained in each of the compounds represented by Chemical Formulae (8) to (10) each independently represent a methyl group, a methoxy group, a dialkylamino group, or an alkylamino group, and the other $R_2$s each independently represent hydrogen or an alkyl group having a carbon number of 3 or less.

In the case where the compounds represented by Chemical Formulae (8) to (10) contain a dialkylamino group, a dialkylamino group having two alkyl groups having a carbon number of 3 or less is preferred, and more preferably, one of the alkyl groups is a methyl group. Still more preferably, one alkyl group is a methyl group, and the other alkyl group is an alkyl group having a carbon number of 3 or less. A dimethylamino group is particularly preferred.

In the case where the compounds represented by Chemical Formulae (8) to (10) contain an alkylamino group, it is preferred that the compounds have an alkyl group having a carbon number of 3 or less. An alkyl group having a carbon number of 2 or less is more preferred. A methylamino group is further preferred.

The addition of a methyl group, a dialkylamino group, and an alkylamino group to the molecular structures of the compounds represented by Chemical Formulae (8) to (10) is effective for enhancing exposure sensitivity, compared with the case where a methoxy group that is another electron donating group is added.

Accordingly, it is more preferred that at least two $R_2$s among $R_2$s contained in each of the compounds represented by Chemical Formulae (8) to (10) each independently represent a methyl group, a dialkylamino group, or an alkylamino group, and the other $R_2$s each independently represent hydrogen or an alkyl group having a carbon number of 3 or less.

Further, it is further preferred that at least two $R_2$s among $R_2$s contained in each of the compounds represented by Chemical Formulae (8) to (10) each independently represent a methyl group, a dimethylamino group, or a methylamino group, and the other $R_2$s each independently represent hydrogen or an alkyl group having a carbon number of 3 or less.

Further, the dimethylamino group is effective for enhancing exposure sensitivity, compared with a methylamino group, in the case where the dimethylamino group is contained in the compounds represented by Chemical Formulae (8) to (10).

Accordingly, it is more preferred that at least two $R_2$s among $R_2$s contained in each of the compounds represented by Chemical Formulae (8) to (10) each independently represent a methyl group or a dimethylamino group, and the other $R_2$s each independently represent hydrogen or an alkyl group having a carbon number of 3 or less.

Further, of $R_2$s contained in the compounds represented by Chemical Formulae (8) to (10), at least two $R_2$s may represent methyl groups, and the other $R_2$s may each independently represent hydrogen or a methyl group.

Further, of $R_2$s contained in the compounds represented by Chemical Formulae (8) to (10), at least two $R_2$s may represent methyl groups, and the other $R_2$s may each independently represent hydrogen.

Further, in the case where a hydroxyl group that is an electron donating group is added, the surface of a formed liquid crystal alignment film is provided with hydrophilicity. It is also a preferred embodiment that a hydroxyl group is not contained, in terms of the physical properties of the liquid crystal alignment film.

Further, as a halogen group, a phenyl group, a nitro group, and the like are electron attracting groups, it is preferred that these groups may not be contained in the molecular structures of the compounds represented by Chemical Formulae (8) to (10). However, they may be contained as long as the effects of the present invention are not impaired.

Further, as the compounds represented by Chemical Formulae (8) to (10) have a naphthalene skeleton, in the case where a photo-alignment process is conducted with respect to the polyimide and the precursor thereof formed using the compounds represented by Chemical Formulae (8) to (10), the photo-alignment process is conducted by extracting UV rays at 300 nm or more using a long arc lamp as a light source, and irradiating an organic coating film formed on a substrate with irradiation light linearly polarized with a pile polarizer in which quartz substrates are laminated on each other at predetermined irradiation energy.

The naphthalene skeleton has an absorption band in a UV wavelength region of 300 nm or more. Therefore, a long arc lamp irradiating stronger UV rays compared with those of a low-pressure mercury lamp can be used.

As described above, the exposure amount is calculated by a product of an illumination by an irradiation time.

The time for photo-alignment can be further shortened by using the polyimide and the precursor thereof formed of the compounds represented by Chemical Formulae (8) to (10) in which enhanced sensitivity is realized, and by using a lamp having a high illumination such as a long arc lamp.

Further, it is preferred that the diamine represented by Chemical Formulae (8) to (10) react with at least one kind of tetracarboxylic acid dianhydride selected from the Compound group C represented by the following Chemical Formulae (11) to (17) to form the polyimide.

[Compound group C]

(11)

(12)

(13)

(14)

(15)

(16)

(17)

In the formulae (11) to (17), $R_3$s each independently represent hydrogen, an alkyl group having a carbon number of 3 or less, or an alkoxy group having a carbon number of 3 or less.

Further, S represents —$(CH_2)_n$—, and n represents an integer of 1 to 10.)

The polyimide and the precursor thereof formed when the diamine represented by Chemical Formulae (8) to (10) reacts with tetracarboxylic acid dianhydride selected from the Compound group C represented by Chemical Formulae (11) to (17) have excellent characteristics in a light transmittance, heat resistance, and film strength, as well as exposure sensitivity.

Further, in the formulae (11) to (17), it is more preferred that $R_3$s each independently represent hydrogen, a methyl group, and an alkoxy group having a carbon number of 3 or less.

In addition, it is more preferred that at least one of $R_3$ represent a methyl group or an alkoxy group having a carbon number of 2 or less, in terms of enhancing the sensitivity with respect to UV rays in a photo-alignment process.

Thus, it is more preferred that $R_3$s each independently represent hydrogen, a methyl group, or an alkoxy group having a carbon number of 2 or less.

Further, it is more preferred that $R_3$s each independently represent hydrogen, a methyl group, and a methoxy group.

Further, the case where electron donating groups other than those described above and another functional group are added to the molecular structures of the compounds represented by Chemical Formulae (11) to (17) is described.

In the case where a hydroxyl group that is an electron donating group is added, the surface of a formed liquid crystal alignment film is provided with hydrophilicity. It is also a preferred embodiment that a hydroxyl group is not contained, in terms of the physical properties of the liquid crystal alignment film.

Further, as a halogen group, a phenyl group, a nitro group, and the like are electron attracting groups, it is preferred that these groups may not be contained in the molecular structures of the compounds represented by Chemical Formulae (11) to (17). However, they may be contained as long as the effects of the present invention are not impaired.

Further, it is preferred that diamine selected from the Compound group B represented by Chemical Formulae (8) to (10) be diamine represented by the following Chemical Formula (18).

(18)

In the formula (18), $R_4$s each independently represent hydrogen, an alkyl group having a carbon number of 3 or less, an alkoxy group having a carbon number of 3 or less, a dialkylamino group, or an alkylamino group, and $R_5$s each independently represent a methyl group, an alkoxy group having a carbon number of 3 or less, a dialkylamino group, or an alkylamino group.

In the case where an electron donating group is added to $R_5$, the exposure sensitivity of the polyimide and the precursor thereof formed using the compound represented by Chemical Formula (18) is more excellent.

In the case where $R_5$ of the compound represented by Chemical Formula (18) contains an alkoxy group, an alkoxy group having a carbon number of 2 or less is more preferred, and a methoxy group is further preferred.

Thus, it is preferred that $R_5$s each independently represent a methyl group, an alkoxy group having a carbon number of 2 or less, a dialkylamino group, or an alkylamino group.

Further, it is further preferred that $R_5$s each independently represent a methyl group, a methoxy group, a dialkylamino group, or an alkylamino group.

In the case where $R_5$ of the compound represented by Chemical Formula (18) contains a dialkylamino group, it is preferred that the dialkylamino group have two alkyl groups having a carbon number of 3 or less, and more preferably, one alkyl group represents a methyl group. A dimethylamino group is further preferred.

In the case where $R_5$ of the compound represented by Chemical Formula (18) contains an alkylamino group, it is preferred that the alkylamino group have an alkyl group having a carbon number of 3 or less, and an alkyl group having a carbon number of 2 or less is more preferred. A methylamino group is further preferred.

Further, it is preferred that $R_5$ of the compound represented by Chemical Formula (18) contain a methyl group, a dialkylamino group, or an alkylamino group, compared with the case where $R_5$ contains a methoxy group.

Thus, it is more preferred that $R_5$s each independently represent a methyl group, a dialkylamino group, or an alkylamino group.

Further, $R_5$s may each independently represent a methyl group or an alkylamino group.

Further, $R_5$s may each independently represent a methyl group or a dialkylamino group.

Further, both of the two $R_5$s may each independently represent a methyl group in the compound represented by Chemical Formula (18).

In the case where $R_4$ of the compound represented by Chemical Formula (18) contains an alkoxy group, an alkoxy group having a carbon number of 2 or less is more preferred, and a methoxy group is further preferred.

Thus, it is more preferred that $R_4$s each independently represent hydrogen, an alkyl group having a carbon number of 3 or less, an alkoxy group having a carbon number of 2 or less, a dialkylamino group, or an alkylamino group.

Thus, it is further preferred that $R_4$s each independently represent hydrogen, an alkyl group having a carbon number of 3 or less, a methoxy group, a dialkylamino group, or an alkylamino group.

In the case where $R_4$ of the compound represented by Chemical Formula (18) contains an alkyl group, an alkyl group having a carbon number of 2 or less is more preferred, and a methyl group is further preferred.

Thus, it is more preferred that $R_4$s each independently represent hydrogen, an alkyl group having a carbon number of 2 or less, a methoxy group, a dialkylamino group, or an alkylamino group.

Further, it is further preferred that $R_4$s each independently represent hydrogen, a methyl group, a methoxy group, a dialkylamino group, or an alkylamino group.

In the case where $R_4$ of the compound represented by Chemical Formula (18) contains a dialkylamino group, it is preferred that the dialkylamino group have two alkyl groups having a carbon number of 3 or less, and more preferably, one alkyl group represents a methyl group. A dimethylamino group is further preferred.

In the case where $R_4$ of the compound represented by Chemical Formula (18) contains an alkylamino group, it is preferred that the alkylamino group have an alkyl group having a carbon number of 3 or less, and an alkyl group having a carbon number of 2 or less is more preferred. A methylamino group is further preferred.

Thus, it is more preferred that $R_4$s each independently represent hydrogen, a methyl group, a methoxy group, a dimethylamino group, or an methylamino group.

Further, $R_4$s may each independently represent hydrogen or a methyl group.

Further, $R_4$s may each independently represent hydrogen or a methoxy group.

Further, $R_4$s may each independently represent hydrogen or a dimethylamino group.

Further, $R_4$s may each independently represent hydrogen or an alkylamino group.

Further, $R_4$s may each independently represent hydrogen, a dimethylamino group, or an alkylamino group.

In addition, both of the two $R_4$ may be hydrogen in the compound represented by Chemical Formula (18). Further, both of the two $R_4$ may represent methyl groups.

$R_4$ and $R_5$ of the compound represented by Chemical Formula (18) described above may be appropriately combined.

For example, $R_4$s may each independently represent hydrogen or a methyl group, and $R_5$s may each independently represent a methyl group, a dialkylamino group, or an alkylamino group.

Further, $R_4$s may each independently represent hydrogen or a methyl group, and $R_5$s may each independently represent a methyl group or an alkylamino group.

Further, $R_4$s may each independently represent hydrogen or a methoxy group, and $R_5$s may each independently represent a methyl group, a dialkylamino group, or an alkylamino group.

Further, $R_4$s may each independently represent hydrogen or a dimethylamino group, and $R_5$s may each independently a methyl group, a dialkylamino group, or an alkylamino group.

Further, $R_4$s may each independently represent hydrogen or an alkylamino group, and $R_5$s may each independently represent a methyl group, a dialkylamino group, or an alkylamino group.

Further, $R_4$s may each independently represent hydrogen, a dimethylamino group, or an alkylamino group, and $R_5$s may each independently represent a methyl group, a dialkylamino group, or an alkylamino group.

Further, $R_4$s may each independently represent hydrogen or a methyl group, and $R_5$s may each independently represent a methyl group or an alkylamino group.

Further, $R_4$s may each independently represent hydrogen or a methoxy group, and $R_5$s may each independently represent a methyl group or an alkylamino group.

Further, $R_4$s may each independently represent hydrogen or a dimethylamino group, and $R_5$s may each independently represent a methyl group or an alkylamino group.

Further, $R_4$s may each independently represent hydrogen or an alkylamino group, and $R_5$s may each independently represent a methyl group or an alkylamino group.

Further, $R_4$s may each independently represent hydrogen, a dimethylamino group, or an alkylamino group, and $R_5$s may each independently represent a methyl group or an alkylamino group.

Further, $R_4$s may each independently represent hydrogen or a methyl group, and $R_5$s may each independently represent a methyl group or a dialkylamino group.

Further, $R_4$s may each independently represent hydrogen or a methoxy group, and $R_5$s may each independently represent a methyl group or a dialkylamino group.

Further, $R_4$s may each independently represent hydrogen or a dimethylamino group, and $R_5$s may each independently represent a methyl group or a dialkylamino group.

Further, $R_4$s may each independently represent hydrogen or an alkylamino group, and $R_5$s may each independently represent a methyl group or a dialkylamino group.

Further, $R_4$s may each independently represent hydrogen, a dimethylamino group, or an alkylamino group, and $R_5$s may each independently represent a methyl group or a dialkylamino group.

Further, the case where an electron donating group other than those described above and another functional group are added to the molecular structure of the compound represented by Chemical Formula (18) is described.

For example, in the case where a hydroxyl group that is an electron donating group is added, the surface of a formed liquid crystal alignment film is provided with hydrophilicity. It is also a preferred embodiment that a hydroxyl group is not contained, in terms of the physical properties of the liquid crystal alignment film.

Further, as a halogen group, a phenyl group, a nitro group, and the like are electron attracting groups, it is preferred that these groups be not contained in the molecular structure of the compound represented by Chemical Formula (18). However, they may be contained as long as the effects of the present invention are not impaired.

It is more preferred that the diamine represented by Chemical Formula (18) react with at least one kind of tetracarboxylic acid dianhydride selected from the Compound group C represented by the following Chemical. Formulae (11) to (17) to form polyimide and a precursor thereof.

[Compound group C]

(11)

(12)

(13)

(14)

19

-continued

In the formulae (11) to (17), $R_3$s each independently represent hydrogen, an alkyl group having a carbon number of 3 or less, or an alkoxy group having a carbon number of 3 or less.

Further, S represents —$(CH_2)_n$—, and n represents an integer of 1 to 10.

The polyimide and the precursor thereof formed when the diamine represented by Chemical Formula (18) reacts with tetracarboxylic acid dianhydride selected from the Compound group C represented by Chemical Formulae (11) to (17) have excellent characteristics in a light transmittance, heat resistance, and film strength, as well as exposure sensitivity.

Further, it is more preferred that $R_3$s each independently represent hydrogen, a methyl group, or an alkoxy group having a carbon number of 3 or less.

In addition, it is more preferred that at least one of $R_3$s represent a methyl group or an alkoxy group having a carbon number of 2 or less, in terms of enhancing the sensitivity with respect to UV rays in a photo-alignment process.

Thus, it is more preferred that $R_3$s each independently represent hydrogen, a methyl group, or an alkoxy group having a carbon number of 2 or less.

Further, it is more preferred that $R_3$s each independently represent hydrogen, a methyl group, and a methoxy group.

Further, the case where electron donating groups other than those described above and other functional groups are added to the molecular structures of the compounds represented by Chemical Formulae (11) to (17) is described.

In the case where a hydroxyl group that is an electron donating group is added, the surface of a formed liquid crystal alignment film is provided with hydrophilicity. It is also a preferred embodiment that a hydroxyl group is not contained, in terms of the physical properties of the liquid crystal alignment film.

Further, as a halogen group, a phenyl group, a nitro group, and the like are electron attracting groups, it is preferred that these groups are not contained in the molecular structures of the compounds represented by Chemical Formulae (11) to (17). However, they may be contained as long as the effects of the present invention are not impaired.

20

Example 1

A liquid crystal display device according to an embodiment of the present invention is described with reference to FIG. 1 and FIGS. 2A, 2B, and 2C.

Figure 1:
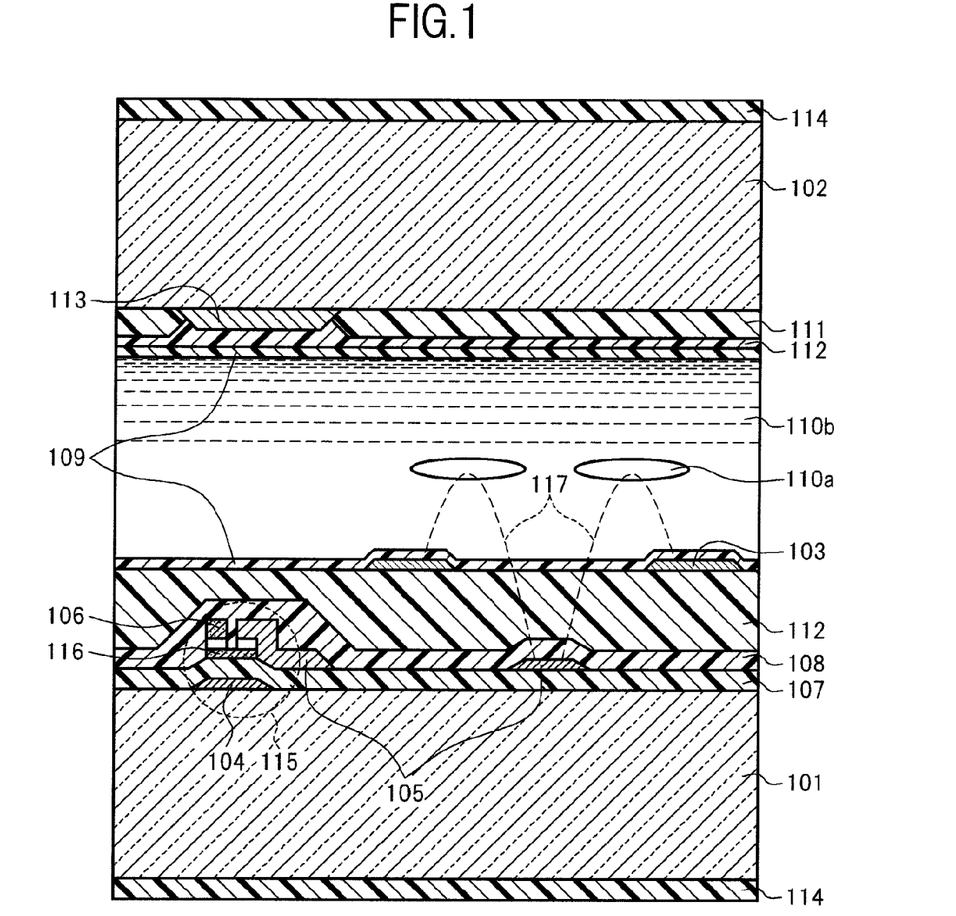
FIG. 1 is a cross-sectional view of a pixel portion, illustrating a pixel configuration of a liquid crystal display device according to an embodiment of the present invention.
Figure 2A:
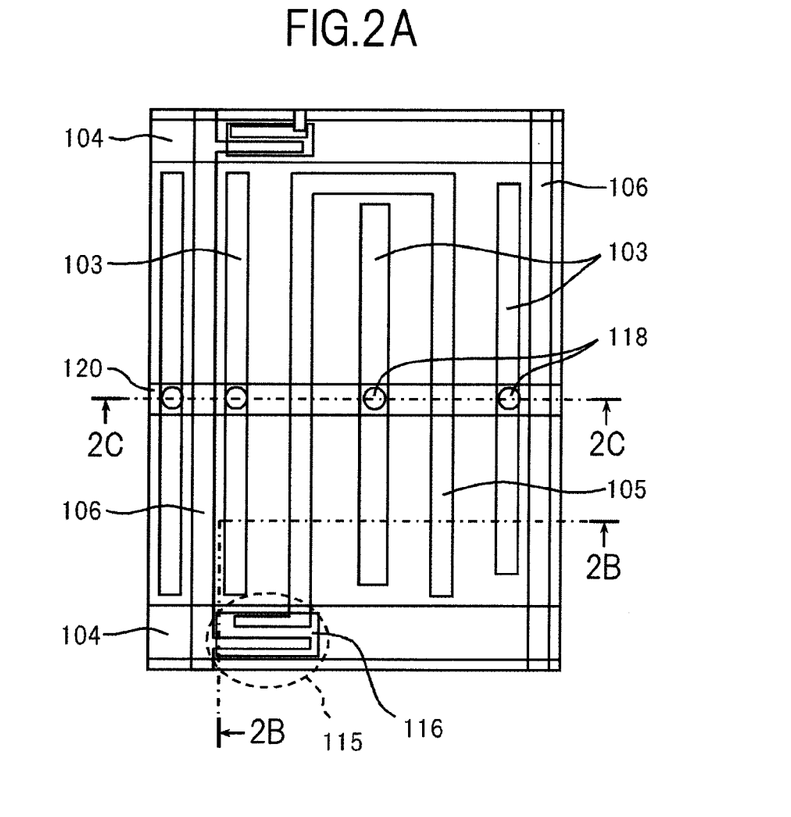
FIG. 2A is a plan view of a pixel portion, illustrating a pixel configuration of a liquid crystal display device according to an embodiment of the present invention.
Figure 2B:
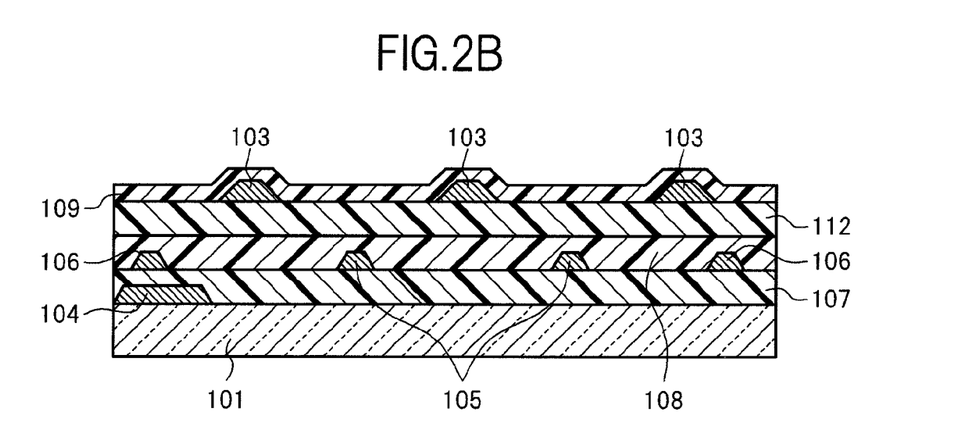
FIG. 2B is a cross-sectional view of a pixel portion, illustrating a pixel configuration of a liquid crystal display device according to an embodiment of the present invention, which is a view illustrating a cross-section taken along line 2B-2B of FIG. 2A.
Figure 2C:
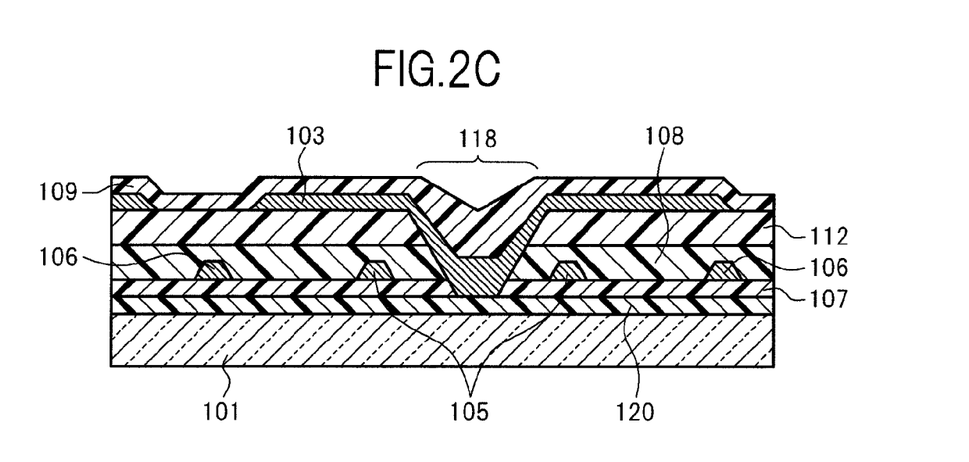
FIG. 2C is a cross-sectional view of a pixel portion, illustrating a pixel configuration of a liquid crystal display device according to an embodiment of the present invention, which is a view illustrating a cross-section taken along line 2C-2C of FIG. 2A.

FIG. 1 is a schematic cross-sectional view illustrating the vicinity of one pixel in the liquid crystal display device according to this example. FIG. 2 are schematic views of an active matrix substrate illustrating a configuration of the vicinity of one pixel of the liquid crystal display device according to this example, in which FIG. 2A is a plan view, FIG. 2B is a cross-sectional view taken along the line 2B-2B illustrated in FIG. 2A, and FIG. 2C is a cross-sectional view taken along the line 2C-2C illustrated in FIG. 2A. Further, FIG. 1 corresponds to a part of a cross section taken along the line 2B-2B illustrated in FIG. 2A.

FIGS. 2B and 2C schematically emphasize configurations of main portions, and do not correspond one by one to cut portions of the line 2B-2B and the line 2C-2C in FIG. 2A. For example, a semiconductor film 116 is not shown in FIG. 2B, and only one through-hole 118 that connects a common electrode 103 and a common electrode line (common line) 120 is representatively illustrated in FIG. 2C.

In this embodiment, scanning lines (gate lines) 104 and the common electrode line 120 which are made of chrome (Cr) are arranged on a glass substrate 101 as the active matrix substrate, and a gate insulating film 107 made of silicon nitride is so formed as to cover the scanning lines 104 and the common electrode line 120.

Further, the semiconductor film 116 made of amorphous silicon or polysilicon is arranged above each of the scanning lines 104 through the gate insulating film 107, and functions as an active layer of each thin film transistor (TFT) 115 serving as the active element.

Further, each signal line (drain electrode) 106 made of chrome/molybdenum (Cr.Mo) and each pixel electrode (source electrode) 105 made of an indium tin oxide (ITO) film are so arranged as to be superimposed on a part of the pattern of the semiconductor film 116, and a protective insulating film 108 made of silicon nitride is so formed as to cover all of those components.

Further, as illustrated in FIG. 2C, the common electrodes 103 that connect to the common electrode line 120 through the through-hole 118 formed through the gate insulating film 107 and the protective insulating film 108 are arranged on an organic protective film (overcoat layer) 112.

Further, as illustrated in FIG. 2A, the common electrodes 103 drawn from the common electrode line 120 through the through-hole 118 are so formed as to face the pixel electrodes 105 in a region of one pixel in a planar fashion.

In this embodiment, the pixel electrodes 105 are arranged below the protective insulating film 108 which is disposed below the organic protective film 112, and the common electrodes 103 are arranged on the organic protective film 112.

One pixel is configured in a region sandwiched between the plurality of pixel electrodes 105 and the plurality of common electrodes 103.

Further, a liquid crystal alignment film 109 is formed on a surface of the active matrix substrate on which the unit pixels configured as described above are arranged in matrix, that is, on the organic protective film 112 on which the common electrodes 103 are formed.

On the other hand, as illustrated in FIG. 1, a color filter layer 111 is arranged on the glass substrate 102 constituting the counter substrate so as to be partitioned by a light shield film (black matrix) 113 for each pixel. Further, the color filter layer 111 and the light shield film 113 are covered with the organic protective film 112 made of a transparent insulating material. Further, the liquid crystal alignment film 109 is also formed on the organic protective film 112 to configure a color filter substrate.

Those liquid crystal alignment films 109 are provided with liquid crystal alignment capability by irradiation of linearly polarized ultraviolet rays which are extracted with the use of a pile polarizer in which quartz plates are laminated on each other with a low-pressure mercury lamp as a light source.

The glass substrate 101 constituting the active matrix substrate and the glass substrate 102 constituting the color filter substrate are arranged to face each other at the surfaces of the liquid crystal alignment films 109, and a liquid crystal composition layer (liquid crystal layer) 110b made up of liquid crystal molecules 110a are arranged between the glass substrate 101 and the glass substrate 102.

Further, on the respective outer surfaces of the glass substrate 101 constituting the active matrix substrate and the glass substrate 102 constituting the color filter substrate, polarization plates 114 are formed.

In the above mentioned manner, the active matrix liquid crystal display device (TFT liquid crystal display device) using the TFT 115 is configured. In the TFT liquid crystal display device, the liquid crystal molecules 110a constituting the liquid crystal composition layer 110b are aligned substantially in parallel to the surfaces of the glass substrates 101 and 102 which face each other at the time of applying no electric field. The liquid crystal molecules 110a are homogeneously aligned in a state in which the liquid crystal molecules 110a are directed in an initial alignment direction regulated by the photo-alignment process.

Here, when a voltage is applied to the scanning lines 104 to turn on the TFT 115, an electric field 117 is applied to the liquid crystal composition layer 110b due to a potential difference between the pixel electrode 105 and the common electrodes 103. The liquid crystal molecules 110a constituting the liquid crystal composition layer 110b are turned to the electric field direction due to an interaction between a dielectric anisotropy of the liquid crystal composition layer 110b and the electric field. In this situation, the refractive anisotropy of the liquid crystal composition layer 110b and the action of the polarization plates 114 can change the light transmittance of the liquid crystal display device for display.

Further, the organic protective film 112 may be made of a thermosetting resin such as an acrylic resin, an epoxy acrylic resin or a polyimide resin which are excellent in the insulating property and the transparency. Further, the organic protective film 112 may be made of a light curing transparent resin, or an inorganic material such as a polysiloxane resin. Further, the organic protective film 112 may also function as the liquid crystal alignment film 109.

As described above, according to this example, the liquid crystal alignment capability of the liquid crystal alignment film 109 is performed by using not a rubbing alignment process that directly rubs the liquid crystal alignment film 109 with a buff cloth, but a non-contact photo-alignment method. As a result, uniform alignment can be given to the entire surface of the display region without local disturbance of alignment in the vicinity of the electrodes.

In general, in the in-plane switching (IPS) system, no interface tilt with the substrate surface is required in principle unlike the vertical electric field system represented by the conventional twisted nematic (TN) system. It is known that the viewing angle characteristic is more improved as the interface tilt angle becomes smaller. A smaller interface tilt angle is desired even in the photo-aligned liquid crystal alignment film. In particular, when the interface tilt angle is set to 1 degree or less, changes in color and brightness due to the viewing angle of the liquid crystal display device can be remarkably suppressed, which is effective.

Subsequently, as a method of manufacturing the liquid crystal display device of this example, formation of the liquid crystal alignment film by using a rubbing less alignment method for a liquid crystal alignment film is described in detail. A flow of a process of forming the liquid crystal alignment film according to this example includes the following steps (1) to (4).

Step (1): Coating and formation of varnish containing components constituting the liquid crystal alignment film (a uniform coating film is formed on the entire surface of the display region).

Step (2): Imidization baking of the organic coating film (removal of varnish solvent and polyimidization high in heat resistance are enhanced).

Step (3): Impartation of the liquid crystal alignment capability by irradiation of the polarized light (the uniform alignment capability is imparted to the display region).

Step (4): Enhancement and stabilization of the alignment capability (by heating, infrared radiation, far infrared radiation, electron beam irradiation or radiation exposure).

The liquid crystal alignment film is formed through the above-mentioned four-step process. However, the present invention is not limited to the order of the process of the above-mentioned steps (1) to (4). Moreover, further effects are expected in the case of the following cases (a) and (b).

(a) The above-mentioned steps (3) and (4) are so processed as to temporally overlap with each other to accelerate the liquid crystal alignment capability impartation and induce a cross-linking reaction or the like. As a result, the liquid crystal alignment film can be further effectively formed.

(b) In the case of using the heating, the infrared radiation, or the far infrared radiation of the above-mentioned step (4), the above-mentioned steps (2), (3) and (4) are allowed to temporally overlap with each other. As a result, the process of the above-mentioned step (4) can also function as the imidization process of the above-mentioned step (2), and hence the liquid crystal alignment film can be formed in a short time.

Subsequently, a specific manufacturing method of this example is described. A glass substrate having a thickness of 0.7 mm whose surface has been polished is used as the glass substrate 101 constituting the active matrix substrate and the glass substrate 102 constituting the color filter substrate.

The TFT 115 formed on the glass substrate 101 includes the pixel electrode 105, the signal line 106, the scanning line 104, and the semiconductor film (amorphous silicon) 116.

All of the scanning line 104, the common electrode line 120, and the signal line 106 were formed by patterning a chrome film, and an interval between the pixel electrode 105 and each of the common electrodes 103 was set to 7 µm. In this embodiment, the common electrodes 103 and the pixel electrode 105 were formed of the ITO film so as to constitute transparent electrodes to achieve higher brightness characteristics. Alternatively, the common electrodes 103 and the pixel electrode 105 may also be formed of a chrome film which is low in resistance and easy in patterning, instead of the ITO film.

The gate insulating film 107 and the protective insulating film 108 were made of silicon nitride, and the thicknesses were each set to 0.3 µm. An acrylic resin was coated on those films, and a heat treatment at 220° C. for 1 hour was conducted to form the transparent and insulating organic protective film 112.

Then, the through-hole 118 was formed up to the common electrode line 120 through photolithography and etching process as illustrated in FIG. 2C, and the common electrodes 103 that connect to the common electrode line 120 were formed by patterning.

As a result, as illustrated in FIG. 2A, the pixel electrode 105 was arranged among the three common electrodes 103 within the unit pixel (one pixel) to form the active matrix substrate which has 1024×3×768 pixels, which includes 1024×3 (corresponding to R, G, and B) signal lines 106 and 768 scanning lines 104.

In Example 1, the following film was used as the liquid crystal alignment film 109.

First, a tetracarboxylic acid dianhydride represented by the following Chemical formula (201) and p-phenylenediamine were polycondensed in a molar ratio of 1:1 to obtain a polyamic acid.

(201)

After that, 5 parts by weight of the polyamic acid and 95 parts by weight of a solvent capable of dissolving the polyamic acid were mixed to prepare liquid crystal alignment agent varnish.

The solvent can be selected appropriately from, for example, dimethylacetamide, γ-butyrolactone, and butyl cellosolve for use.

The liquid crystal alignment agent varnish was applied to a substrate by spin-coating and heated at 230° C. for 10 minutes to form an organic coating film. After that, the organic coating film was irradiated with polarized UV rays having a wavelength of 257 nm, adjusting the illumination and the irradiation time so as to obtain an exposure amount of 2.0 J/cm$^2$, thereby performing a photo-alignment process. Thus, the liquid crystal display device of Example 1 was obtained.

Reference Example 1

In Reference Example 1, the following was used as the liquid crystal alignment film 109. A liquid crystal display device was manufactured by the same method as that of Example 1, except for the composition of the liquid crystal alignment film 109.

First, a tetracarboxylic acid dianhydride represented by the following Chemical formula (202) and p-phenylenediamine were polycondensed in a molar ratio of 1:1 to obtain a polyamic acid.

(202)

Next, 5 parts by weight of the polyamic acid and 95 parts by weight of a solvent capable of dissolving the polyamic acid were mixed to prepare liquid crystal alignment agent varnish.

The solvent can be selected appropriately from, for example, dimethylacetamide, γ-butyrolactone, and butyl cellosolve for use.

In the same manner as in Example 1, the liquid crystal alignment agent varnish was applied to a substrate by spin-coating and heated at 230° C. for 10 minutes to form an organic coating film. After that, a rubbing alignment process was performed. Thus, the liquid crystal display device of Reference Example 1 was obtained.

Comparative Example 1

In Comparative Example 1, the following was used as the liquid crystal alignment film 109. A liquid crystal display device was manufactured by the same method as that of Example 1, except for the composition of the liquid crystal alignment film 109.

First, a tetracarboxylic acid dianhydride represented by the following Chemical formula (202) and p-phenylenediamine were polycondensed in a molar ratio of 1:1 to synthesize a polyamic acid.

(202)

After that, 5 parts by weight of the polyamic acid and 95 parts by weight of a solvent capable of dissolving the polyamic acid were mixed to prepare liquid crystal alignment agent varnish.

The solvent can be selected appropriately from, for example, dimethylacetamide, γ-butyrolactone, and butyl cellosolve for use.

The liquid crystal alignment agent varnish was applied to a substrate by spin-coating and heated at 230° C. for 10 minutes to form an organic coating film. After that, the organic coating film was irradiated with polarized UV rays having a wavelength of 257 nm, adjusting the illumination and the irradiation time so as to obtain an exposure amount of 2.0 J/cm$^2$, thereby performing a photo-alignment process. Thus, the liquid crystal display device of Comparative Example 1 was obtained.

A voltage was applied to the liquid crystal display devices manufactured in Example 1, Reference Example 1, and Comparative Example 1, and the relationship between the light transmittance strength and the voltage was measured. Thus, the sensitivity of the liquid crystal alignment films provided in the liquid crystal display devices were studied.

As a result of the measurement and the comparison between Example 1 and Reference Example 1, the relationships between the light transmittance strength and the voltage were equivalent. Thus, it is understood that, in the liquid crystal display device manufactured in Example 1, an alignment process equivalent to that of Reference Example 1 subjected to the rubbing alignment process was conducted.

In order for the liquid crystal display device of Comparative Example 1 to obtain performance equivalent to that of the liquid crystal display device of Example 1, it was necessary to adjust the irradiation time of the polarized UV ray having a wavelength of 257 nm to be applied to the organic coating film so that the exposure amount was 10.0 J/cm$^2$.

That is, it was found that the photo-alignment process can be conducted at an exposure amount of about ⅕, by adding a dimethylamino group to the tetracarboxylic acid dianhydride.

The exposure amount is obtained by a product of the illumination by the irradiation time. Therefore, in the case where a photo-alignment process was conducted from a light source with the identical illumination, the irradiation time was shortened to about ⅕ by allowing the tetracarboxylic acid dianhydride to have a structure of a dimethylamino group in the organic coating film.

Example 2

In Example 2, the following was used as the liquid crystal alignment film 109. A liquid crystal display device was manufactured by the same method as that of Example 1, except for the composition of the liquid crystal alignment film 109.

First, a diamine represented by the following Chemical Formula (204) and a tetracarboxylic acid dianhydride represented by the following Chemical formula (205) were polycondensed in a molar ratio of 1:1 to obtain a polyamic acid.

(204)

(205)

Next, 5 parts by weight of the polyamic acid and 95 parts by weight of a solvent capable of dissolving the polyamic acid were mixed to prepare liquid crystal alignment agent varnish.

The solvent can be selected appropriately from, for example, dimethylacetamide, γ-butyrolactone, and butyl cellosolve for use.

The liquid crystal alignment agent varnish was applied to a substrate by spin-coating and heated at 230° C. for 10 minutes to form an organic coating film. After that, the organic coating film was irradiated with polarized UV rays using a long arc lamp, adjusting the illumination and the irradiation time so as to obtain an exposure amount of 1.0 J/cm², thereby performing a photo-alignment process. Thus, the liquid crystal display device of Example 2 was obtained.

Reference Example 2

In Reference Example 2, the following was used as the liquid crystal alignment film 109. A liquid crystal display device was manufactured by the same method as that of Example 1, except for the composition of the liquid crystal alignment film 109.

First, a diamine represented by the following Chemical formula (204) and a tetracarboxylic acid dianhydride represented by the following Chemical formula (205) were polycondensed in a molar ratio of 1:1 to synthesize a polyamic acid.

(204)

(205)

Next, 5 parts by weight of the polyamic acid and 95 parts by weight of a solvent capable of dissolving the polyamic acid were mixed to prepare liquid crystal alignment agent varnish.

The solvent can be selected appropriately from, for example, dimethylacetamide, γ-butyrolactone, and butyl cellosolve for use.

The liquid crystal alignment agent varnish was applied to a substrate by spin-coating and heated at 230° C. for 10 minutes to form an organic coating film. After that, a rubbing process was performed. Thus, the liquid crystal display device of Reference Example 2 was obtained.

Comparative Example 2

In Comparative Example 2, the following was used as the liquid crystal alignment film 109. A liquid crystal display device was manufactured by the same method as that of Example 1, except for the composition of the liquid crystal alignment film 109.

First, p-phenylenediamine and a tetracarboxylic acid dianhydride represented by the following Chemical formula (205) were polycondensed in a molar ratio of 1:1 to obtain a polyamic acid.

(205)

Next, 5 parts by weight of the polyamic acid and 95 parts by weight of a solvent capable of dissolving the polyamic acid were mixed to prepare liquid crystal alignment agent varnish.

The solvent can be selected appropriately from, for example, dimethylacetamide, γ-butyrolactone, and butyl cellosolve for use.

The liquid crystal alignment agent varnish was applied to a substrate by spin-coating and heated at 230° C. for 10 minutes to form an organic coating film. After that, the organic coating film was irradiated with polarized UV rays having a wavelength of 257 nm, adjusting the irradiation time so as to obtain performance equivalent to that of Example 2, thereby performing a photo-alignment process. Thus, the liquid crystal display device of Comparative Example 2 was obtained.

A voltage was applied to the liquid crystal display devices manufactured in Example 2 and Comparative Example 2, and the relationship between the light transmittance strength and the voltage was measured. Thus, the sensitivity of the liquid crystal alignment films provided in the liquid crystal display devices were studied.

As a result of the measurement and the comparison between Example 2 and Reference Example 2, the relationships between the light transmittance strength and the voltage were equivalent. Thus, it is understood that, in the liquid crystal display device manufactured in Example 2, an alignment process equivalent to that of Reference Example 2 subjected to the rubbing alignment process was conducted.

In Comparative Example 2, in order to obtain the results equivalent to those of Example 2, it was necessary to irradiate the organic coating film with the UV ray having a wavelength of 257 nm for a time that is about three times the irradiation time of Example 2.

Accordingly, it was found that a photo-alignment process can be conducted for an irradiation time that is about ⅓ of the conventional example, by having a naphthalene skeleton and further adding methyl groups to 2,6-positions.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device, comprising:
a pair of substrates at least one of which is transparent;
a liquid crystal layer disposed between the pair of substrates;
an electrode group formed on one substrate of the pair of substrates, for applying an electric field to the liquid crystal layer, the electric field having a component parallel to the one substrate;
a plurality of active elements connected to the electrode group; and
a liquid crystal alignment film disposed on at least one substrate of the pair of substrates,
wherein an interface tilt angle between the liquid crystal layer and the liquid crystal alignment film is set to 1 degree or less; and
wherein the liquid crystal alignment film, which is formed by a photo-alignment process, contains polyimide formed using at least one kind of tetracarboxylic acid dianhydride selected from a compound group A represented by the following Chemical Formulae (201), (6) and (7):

[Compound group A]

(201)

(6)

(7)

where $R_1$s each independently represent hydrogen, an alkyl group having a carbon number of 3 or less, or a dialkylamino group, and at least one $R_1$ represents a dialkylamino group, where S represents —$(CH_2)_n$—, and n represents an integer of 1 to 10.

2. The liquid crystal display device according to claim 1, wherein any alkyl group of the dialkylamino group represents a dialkylamino group having a carbon number of 3 or less.

3. The liquid crystal display device according to claim 1, wherein the dialkylamino group is a dimethylamino group.

4. The liquid crystal display device according to claim 1, wherein the tetracarboxylic acid dianhydride reacts with at least one kind of diamine selected from a compound group B represented by the following Chemical Formulae (8) to (10):

[Compound group B]

(8)

(9)

(10)

where among $R_2$s contained in each of the formulae (8) to (10), at least two $R_2$s each independently represent a methyl group, an alkoxy group having a carbon number of 3 or less, a dialkylamino group, or an alkylamino group and the other $R_2$s each independently represent hydrogen or an alkyl group having a carbon number of 3 or less.

5. The liquid crystal display device according to claim 4, wherein the diamine is represented by the following Chemical Formula (18):

(18)

where $R_4$s each independently represent hydrogen, an alkyl group having a carbon number of 3 or less, an alkoxy group having a carbon number of 3 or less, a dialkylamino group, or an alkylamino group; and $R_5$s each independently represent a methyl group, an alkoxy group having a carbon number of 3 or less, a dialkylamino group, or an alkylamino group.

6. The liquid crystal display device according to claim 1, wherein the liquid crystal alignment film contains polyimide formed using Chemical Formula (201)

(201)

7. The liquid crystal display device according to claim 6, wherein the tetracarboxylic acid dianhydride reacts with at least one kind of diamine selected from a compound group B represented by the following Chemical Formulae (8) to (10):

[Compound group B]

(8)

(9)

(10)

where among $R_2$s contained in each of the formulae (8) to (10), at least two $R_2$s each independently represent a methyl group, an alkoxy group having a carbon number of 3 or less, a dialkylamino group, or an alkylamino group and the other $R_2$s each independently represent hydrogen or an alkyl group having a carbon number of 3 or less.

8. The liquid crystal display device according to claim 7, wherein the diamine is represented by the following Chemical Formula (18):

(18)

where $R_4$s each independently represent hydrogen, an alkyl group having a carbon number of 3 or less, an alkoxy group having a carbon number of 3 or less, a dialkylamino group, or an alkylamino group; and $R_5$s each independently represent a methyl group, an alkoxy group having a carbon number of 3 or less, a dialkylamino group, or an alkylamino group.

9. The liquid crystal display device according to claim 1, wherein the polyimide is formed by imidizing a polyimide precursor formed using the at least one kind of tetracarboxylic acid dianhydride selected from the compound group A, wherein 50% to 95% of a total amount of the polyimide precursor is imidized to form the polyimide.

10. The liquid crystal display device according to claim 6, wherein the polyimide is formed by imidizing a polyimide precursor formed using the at least one kind of tetracarboxylic acid dianhydride selected from the compound group A, wherein 50% to 95% of a total amount of the polyimide precursor is imidized to form the polyimide.

11. The liquid crystal display device according to claim 1, wherein the liquid crystal alignment film, which is formed by a photo-alignment process, contains polyimide formed using at least one kind of tetracarboxylic acid dianhydride selected from a compound group A' represented by the following Chemical Formulae (201) and (7):

[Compound group A']

(201)

(7)

where $R_1$s each independently represent hydrogen, an alkyl group having a carbon number of 3 or less, or a dialkylamino group, and at least one $R_1$ represents a dialkylamino group.

* * * * *